United States Patent
Kim et al.

(10) Patent No.: US 7,450,917 B2
(45) Date of Patent: Nov. 11, 2008

(54) POWER SAVING TRANSMITTER OF MOBILE COMMUNICATION TERMINAL

(75) Inventors: Seung-Hwan Kim, Suwon-si (KR); Woo-Yong Lee, Seongnam-si (KR); Hyung-Weon Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 592 days.

(21) Appl. No.: 10/998,513

(22) Filed: Nov. 29, 2004

(65) Prior Publication Data

US 2005/0181747 A1 Aug. 18, 2005

(30) Foreign Application Priority Data

Jan. 31, 2004 (KR) ...................... 10-2004-0006482

(51) Int. Cl.
*H04B 1/04* (2006.01)

(52) U.S. Cl. ................. 455/127.5; 455/116; 455/127.1; 455/228; 455/343.4; 455/522; 455/570; 455/574; 455/69

(58) Field of Classification Search ............... 455/127.5, 455/116, 127.1, 228, 343.4, 522, 570, 574, 455/69; 370/342; 330/137; 375/222

See application file for complete search history.

(56) References Cited

U.S. PATENT DOCUMENTS

| 6,226,537 | B1 * | 5/2001 | Namura et al. ............... | 455/574 |
| 6,526,295 | B1 * | 2/2003 | Shull .......................... | 455/574 |
| 7,031,676 | B2 * | 4/2006 | Shi ............................. | 455/126 |

* cited by examiner

*Primary Examiner*—Matthew D Anderson
*Assistant Examiner*—Shaima Q Aminzay
(74) *Attorney, Agent, or Firm*—The Farrell Law Firm, PC

(57) ABSTRACT

A transmitter of a mobile communication terminal including a transmission signal processor for receiving a data signal to be transmitted, modulating the data signal into a radio signal, and outputting the radio signal. A local oscillator device provides the transmission signal processor with a local oscillator signal and a modem for outputs a control signal to power on the transmission signal processor and the local oscillator device when a voice signal is input through a microphone. A delay device for delays the control signal from the modem and provides the transmission signal processor with the delayed control signal.

4 Claims, 4 Drawing Sheets

POWER SAVING TRANSMITTER OF MOBILE COMMUNICATION TERMINAL

PRIORITY

This application claims priority to an application entitled "Transmitter of Mobile Communication Terminal" filed in the Korean Intellectual Property Office on Jan. 31, 2004 and assigned Serial No. 2004-6482, the contents of which are hereby incorporated by reference.

BACKGROUND OF THE INVENTION

1. Field of the Invention

The present invention relates generally to a mobile communication terminal, and more particularly to a transmitter that reduces electrical power consumption in a mobile communication terminal.

2. Description of the Related Art

Commonly, mobile communication terminals are driven by rechargeable batteries in order to secure their mobility. Further, the operation time of mobile communication terminals is determined according to the charge capacity of such rechargeable batteries. Mobile communication terminals have various functions and consume quantities of electric power while driving a plurality of elements according to these various functions. Accordingly, this causes a large limitation in the use of mobile communication terminals, as the batteries of mobile communication terminals must be frequently charged. Therefore, battery-related technologies have been developed, such that many batteries having charge capacities larger than those of previous batteries have come into the market. In addition to such technology for increasing the charge capacity of a battery, technology for saving the power of a battery by minimizing the power consumption in a mobile communication terminal has been continuously developed.

FIG. 1 is a block diagram illustrating a transmitter capable of reducing the power consumption in a conventional mobile communication terminal, and FIG. 2 is a view illustrating an operation of the transmitter in FIG. 1. Referring to FIG. 1, the transmitter includes a modem 10, a transmission signal processor 12, and a local oscillator device 14. The modem 10 converts a voice signal input through a microphone into a digital signal and provides the transmission signal processor 12 with the digital signal. The transmission signal processor 12 modulates the digital signal from the modem 10 into a radio signal and outputs the radio signal.

The transmission signal processor 12 in the mobile communication terminal enters an idle mode, a transmission mode, or a puncture mode according to operation states. In the idle mode, the terminal performs only a reception operation without performing a transmission operation, i.e., the transmission signal processor 12 is in a disabled state. In the transmission mode, the terminal performs both a transmission operation and a reception operation, i.e., the transmission signal processor 12 is in an enabled state. In the puncture mode, some elements of the transmission signal processor 12 are in an off state in order to reduce power consumption in the terminal when the terminal performs both a transmission operation and a reception operation and there exist no transmission data for a predetermined time period.

In the transmission mode, the transmission signal processor 12 is enabled and operates normally. That is, the transmission signal processor 12 is in an enabled state by a control signal from the modem 10. FIG. 2 illustrates a timing of the control signal Tx_ON. In FIG. 2, the control signal enables the transmission signal processor 12 in its high state and disables the transmission signal processor 12 in its low state. When a user communicates using the terminal, the transmission signal processor 12 is enabled to modulate a data signal input from the modem 10 into a radio signal. Because the modem 10 is connected to the microphone, existence or absence of a data signal to be transmitted can be understood. Accordingly, when a voice signal is not input from a user even though the transmission signal processor 12 is in a transmission mode, the modem 10 causes the control signal to be in a low state. As a result, the transmission signal processor 12 is disabled. Herein, the transmission signal processor 12 is switched into the puncture mode.

When the control signal from the modem 10 is in a high state, the transmission signal processor 12 is switched into the transmission mode and processes a voice signal to be transmitted. The local oscillator device 14 provides a local oscillator signal to the transmission signal processor 12 and includes a voltage controlled oscillator (VCO), a phase locked loop (PLL), etc., in order to generate the local oscillator signal.

Additionally, FIG. 2 illustrates an on/off process of the transmission signal processor 12 and the local oscillator device 14 over time when the transmission signal processor 12 is switched from a puncture mode to a transmission mode. When the control signal applied from the modem 10 is in a high state, the transmission signal processor 12 and all elements of the local oscillator device 14 operate. Further, the modem 10 provides a high signal to the transmission signal processor 12, considers a time period for which all elements of the local oscillator device 14 are stabilized, and then provides the transmission signal processor 12 with data signals (I signal and Q signal) to be transmitted (Tx-I/Q). However, when the control signal applied from the modem 10 is in a low state, the transmission signal processor 12 is disabled, but the local oscillator device 14 maintains an enabled state (Tx PLL, VCO) because each element included in the local oscillator device 14 requires a time period for operation stabilization, and the local oscillator device 14 always maintains a current state when the transmission signal processor 12 enters a puncture mode. Accordingly, when the data signals to be transmitted from the modem 10 are not provided to the transmission signal processor 12, the transmission signal processor 12 enters a puncture mode and is disabled. Consequently, power consumption can be reduced.

However, in the conventional transmitter as described above, because the local oscillator device 14, including the VCO, the PLL, etc., is not disabled when the transmission signal processor 12 is in a puncture mode, power consumed by the local oscillator device 14 cannot be further reduced.

SUMMARY OF THE INVENTION

Accordingly, the present invention has been designed to solve the above and other problems occurring in the prior art, and an object of the present invention is to provide a transmitter capable of reducing power consumption in a mobile communication terminal.

In order to accomplish the aforementioned object, according to one aspect of the present, there is provided a transmitter of a mobile communication terminal. The transmitter includes: a transmission signal processor for receiving a data signal to be transmitted, modulating the data signal into a radio signal, and outputting the radio signal; a local oscillator device for providing the transmission signal processor with a local oscillator signal; a modem for outputting a control signal to turn on the transmission signal processor and the local oscillator device when a voice signal is input through a microphone; and a delay device for delaying the control signal from the modem and providing the transmission signal processor with the delayed control signal.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
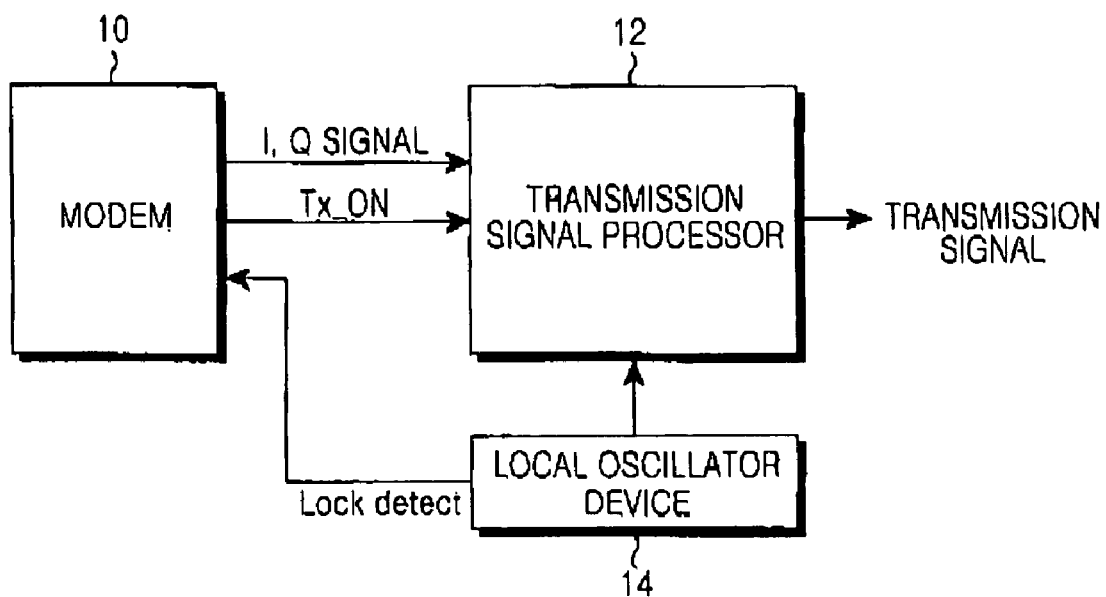
FIG. 1 is a block diagram illustrating a transmitter capable of reducing the power consumption in a conventional mobile communication terminal.
Figure 2:
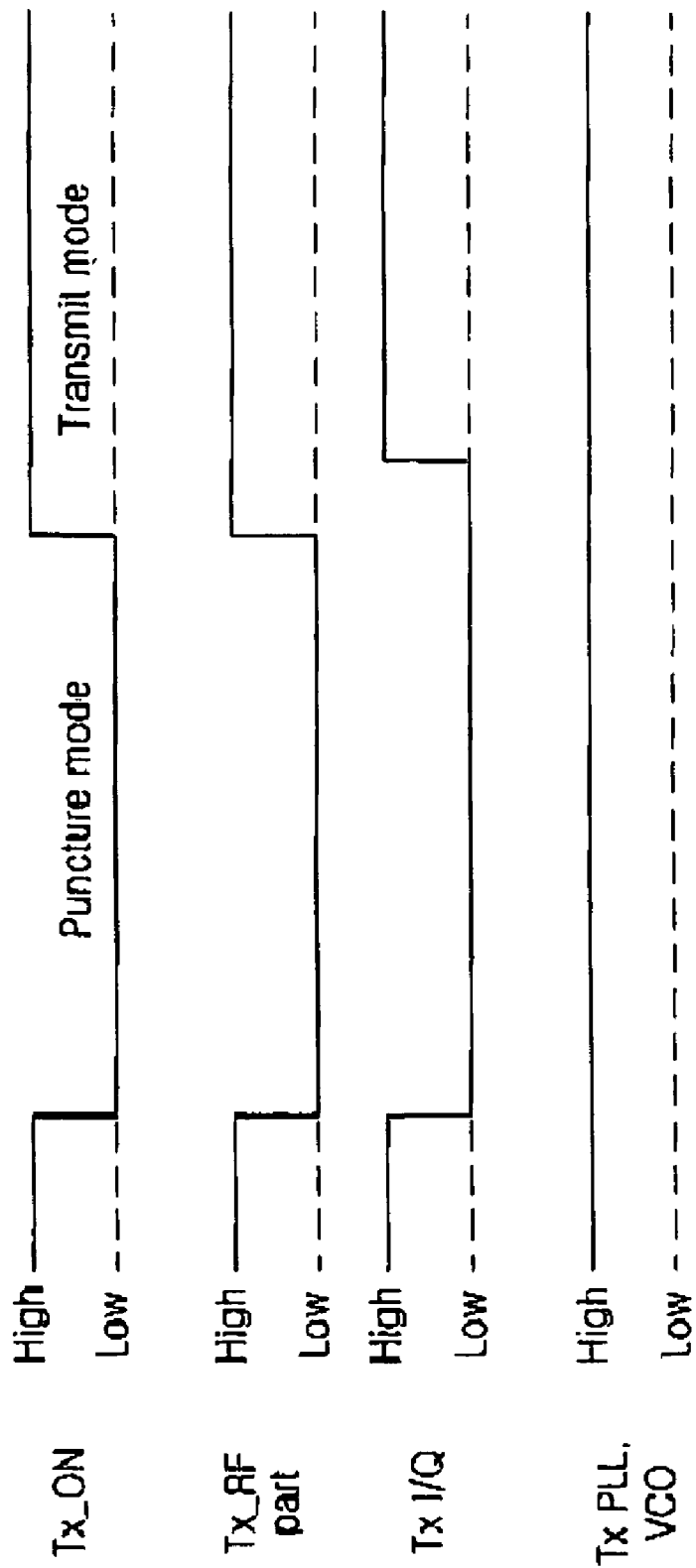
FIG. 2 is a view illustrating a timing operation of the transmitter illustrated in FIG. 1.

Preferred embodiments of the present invention will be described in detail herein below with reference to the accompanying drawings. In the drawings, the same reference numerals are used to designate the same elements as those shown in other drawings. Additionally, in the following description of the present invention, a detailed description of known functions and configurations incorporated herein will be omitted when it may obscure the subject matter of the present invention.

In the present invention, a local oscillator device is turned on/off upon entering a puncture mode in order to more effectively reduce power consumption in the puncture mode, and an operation of a transmission signal processor is delayed during a stabilization time period of the local oscillator device.

Figure 3:
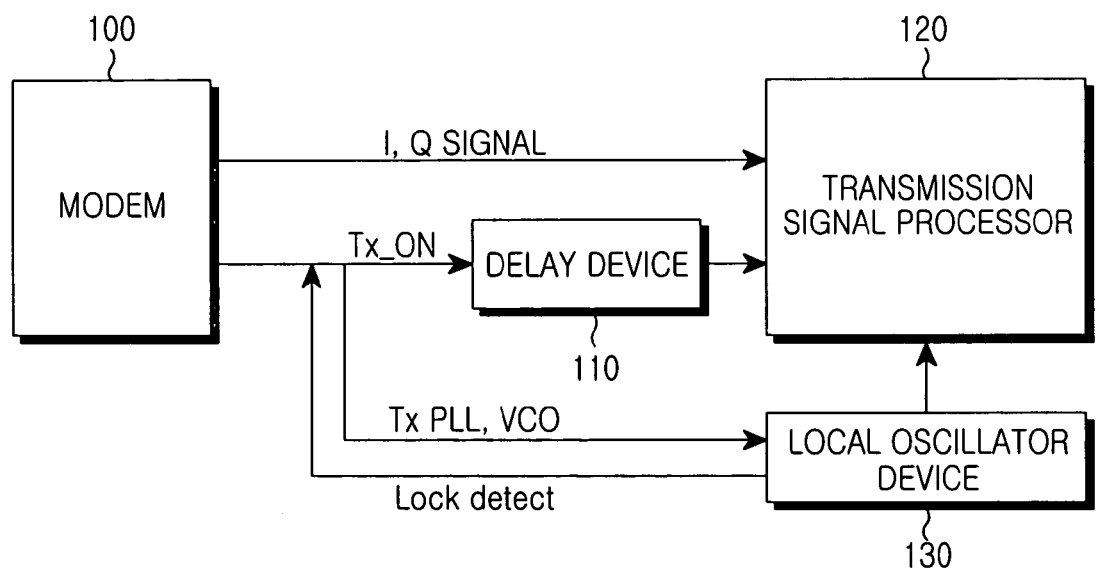
FIG. 3 is a block diagram illustrating a transmitter in a mobile communication terminal according to a preferred embodiment of the present invention.
Figure 4:
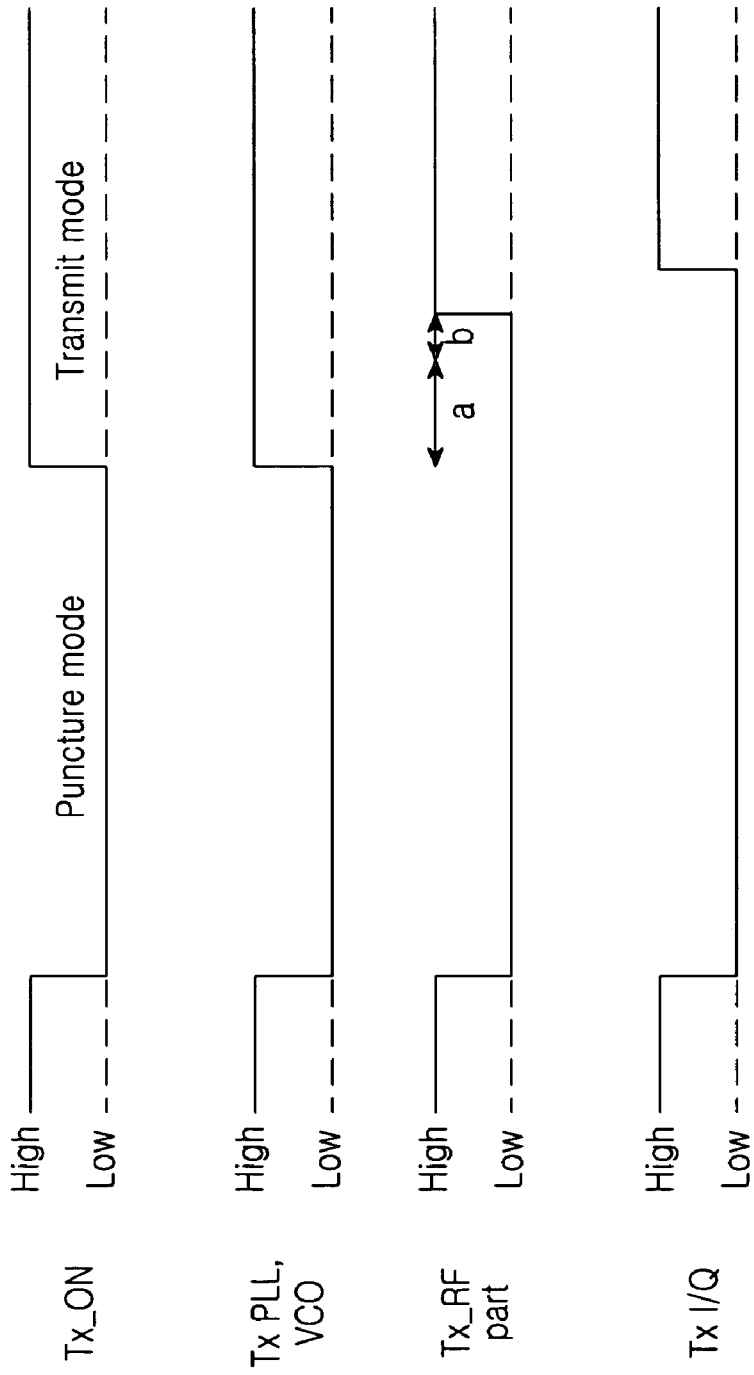
FIG. 4 is a view illustrating a timing operation of the transmitter illustrated in FIG. 3.

FIG. 3 is a block diagram illustrating a transmitter in a mobile communication terminal according to a preferred embodiment of the present invention, and FIG. 4 is a view illustrated timing operation of the transmitter illustrated in FIG. 3. Referring to FIG. 3, the transmitter according to the preferred embodiment of the present invention includes a modem 100, a delay device 110, a transmission signal processor 120, and a local oscillator device 130. The modem 10 converts a voice signal input through a microphone into a digital signal and provides the transmission signal processor 12 with the digital signal. Further, when the voice signal is input through the microphone, the modem 10 outputs a control signal in a high state to the transmission signal processor 120 and the local oscillator device 130 and enables the transmission signal processor 120 and the local oscillator device 130. Herein, the control signal input to the transmission signal processor 120 is applied through the delay device 110. The delay device 110 delays the applied control signal and provides the delayed control signal to the transmission signal processor 120. The delay time of the delay device 110 is programmable through the modem 100. That is, the modem 100 can determine the delay time by setting a register in the transmission signal processor 120.

When the voice signal is not input from the microphone in a transmission mode, the modem 10 outputs a control signal in a low state to the transmission signal processor 120 and the local oscillator device 130 and disables the transmission signal processor 120 and the local oscillator device 130. The transmission signal processor 120 modulates a digital signal from the modem 100 into a radio signal and outputs the radio signal.

Referring to FIG. 4, in a transmission mode, the modem 100 causes a control signal Tx_ON, which is applied to the transmission signal processor 120 and the local oscillator device 130, to be in a high state. In a puncture mode, the modem 100 stops transmitting a data signal and causes the control signal, which is applied to the transmission signal processor 120 and the local oscillator device 130, to be in a low state. Therefore, the transmission signal processor 120 and the local oscillator device 130 are turned off.

In the transmission mode, as illustrated in FIG. 4, the modem 100 causes the control signal, which is applied to the transmission signal processor 120 and the local oscillator device 130, to be in a high state. Herein, the control signal from the modem 100 is directly applied to the local oscillator device 130 (Tx PLL, VCO), but is indirectly applied to the transmission signal processor 120 through the delay device 110. The delay device 110 delays the control signal, which is in a high state, and applies the delayed control signal to the transmission signal processor 120 (Tx_RF part). Accordingly, the transmission signal processor 120 is enabled slightly later than the local oscillator device 130.

The delay time by the delay device 110 is designated by "a" in FIG. 4 and enables an operation of the local oscillator device 130 to be sufficiently stabilized.

After the predetermined time delay "a" by the delay device 110, that is, the local oscillator device 130 has been stabilized, it is determined if the local oscillator device 130 has been locked. Herein, a time for check of the lock is designated by "b".

When the local oscillator device 130 has been locked, a lock detection signal is in a high state and the transmission signal processor 120, including a baseband amplifier, an IQ mixer, a variable gain amplifier, etc., operates. However, when the local oscillator device 130 has not been locked, the transmission signal processor 120 does not operate.

The delay time "a" by the delay device 110 may be freely determined in a predetermined range and must be larger than a time period for which the local oscillator device 130 is stabilized. After the delay time "a" by the delay device 110 and a time period "b" for determining if the local oscillator device 130 has been locked have passed, the modem 100 provides the transmission signal processor 120 with data signals (I signal and Q signal) to be transmitted (Tx-I/Q).

As described above, according to a transmitter in a mobile communication terminal of the present invention, in a puncture mode, LO-related devices such as Tx PLLs or VCOs are turned off, thereby reducing power consumption in the transmitter. In addition, transmission devices such as amplifiers and IQ mixers in transmission signal processors can be also controlled to be turned off, thereby effectively reducing power consumption in the transmitter even more. Accordingly, according to the present invention, the amount of battery consumption is reduced, thereby increasing communication time further.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A transmitter of a mobile communication terminal, comprising:
   a transmission signal processor for receiving a data signal to be transmitted, modulating the data signal into a radio signal, and outputting the radio signal;
   a local oscillator device for providing the transmission signal processor with a local oscillator signal;
   a modem for outputting a control signal to power on the transmission signal processor and the local oscillator device when a voice signal is input through a microphone; and
   a delay device for delaying the control signal from the modem and providing the transmission signal processor with the delayed control signal.

2. The transmitter as claimed in claim 1, wherein the modem outputs a control signal to power off the transmission signal processor and the local oscillator device when a voice signal is not input through the microphone in a transmission mode.

3. The transmitter as claimed in claim 1, wherein a delay time of the delay device is programmable in the modem.

4. The transmitter as claimed in claim 1, wherein the modem determines if synchronization is made when the local oscillator device is powered on, and provides the transmission signal processor with the data signal if the synchronization is made.

* * * * *